United States Patent [19]

England et al.

[11] Patent Number: 5,632,036
[45] Date of Patent: May 20, 1997

[54] SYSTEM AND METHOD FOR PROCESSING INTERPROCESS SIGNALS

[75] Inventors: Laurence E. England, Morgan Hill; Tsuneo Horiguchi, San Jose, both of Calif.; Richard Tallman, Saugerties, N.Y.; Lawrence C. Weber, Toronto, Canada

[73] Assignee: International Business Machines Corporation, Armonk, N.Y.

[21] Appl. No.: 546,233

[22] Filed: Oct. 20, 1995

Related U.S. Application Data

[63] Continuation of Ser. No. 195,718, Feb. 14, 1994, abandoned.
[51] Int. Cl.⁶ ................................................. G06F 9/46
[52] U.S. Cl. ............................................ 395/706; 395/672
[58] Field of Search ................................... 395/500, 650, 395/700

[56] References Cited

U.S. PATENT DOCUMENTS

| | | | |
|---|---|---|---|
| 4,486,831 | 12/1984 | Wheatley et al. | 395/650 |
| 4,835,685 | 5/1989 | Kun | 395/650 |
| 5,027,273 | 6/1991 | Letwin | 395/411 |
| 5,097,533 | 3/1992 | Burger et al. | 395/500 |
| 5,210,874 | 5/1993 | Karger | 395/650 |
| 5,218,699 | 6/1993 | Brandle et al. | 395/650 |
| 5,305,455 | 4/1994 | Anschuetz et al. | 395/700 |
| 5,455,949 | 10/1995 | Conder et al. | 395/700 |

OTHER PUBLICATIONS

The Institute of Electrical and Electronics Engineers, Inc., *IEEE Standards Interpretations for IEEE Std 1003.1–1990 and IEEE Std 2003.1–1992*, Oct. 1994 Edition.

The Institute of Electrical and Electronics Engineers, Inc., *Information technology—Portable Operating System Interface (POSIX) Part 1: System Application Program Interface (API)* [C Language], First Edition 1990-12-07.

The Institute of Electrical and Electronics Engineers, Inc., *Portable Operating System Interface (POSIX) Part 1: System Application Program Interface [API]*Amendment 1: Realtime Extension [C Language], 1994.

*Primary Examiner*—Parshotam S. Lall
*Assistant Examiner*—Viet Vu
*Attorney, Agent, or Firm*—Prentiss W. Johnson, Esq.; Sterne, Kessler, Goldstein & Fox, P.L.L.C.

[57] ABSTRACT

Processing of a first type of interprocess signals and a second type of interprocess signals in a computer system is disclosed. The first type of signals conform to a first signal handling standard and the second type of signals conform to a second signal handling standard. Signal processing operates by determining whether an interprocess signal is a synchronous signal or an asynchronous signal. The interprocess signal originates from a first processing entity and is received by a second processing entity. The interprocess signal is processed using signal handling semantics defined by the first signal handling standard if the interprocess signal is an asynchronous signal. Alternatively, the interprocess signal is processed using a combination of signal handling semantics defined by the first and second signal handling standards if the interprocess signal is a synchronous signal.

25 Claims, 10 Drawing Sheets

FIG. 10C
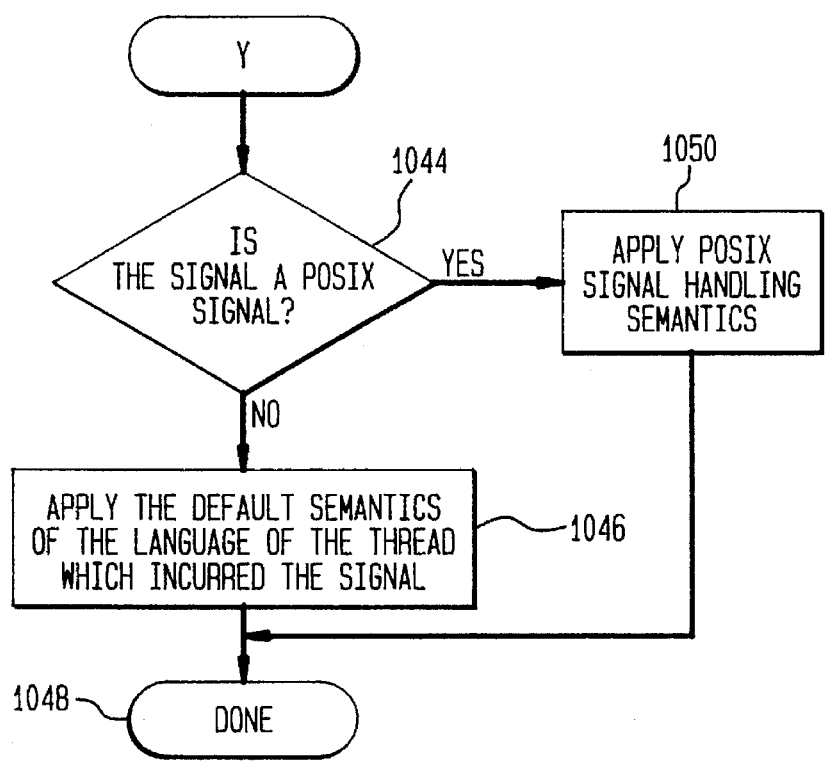
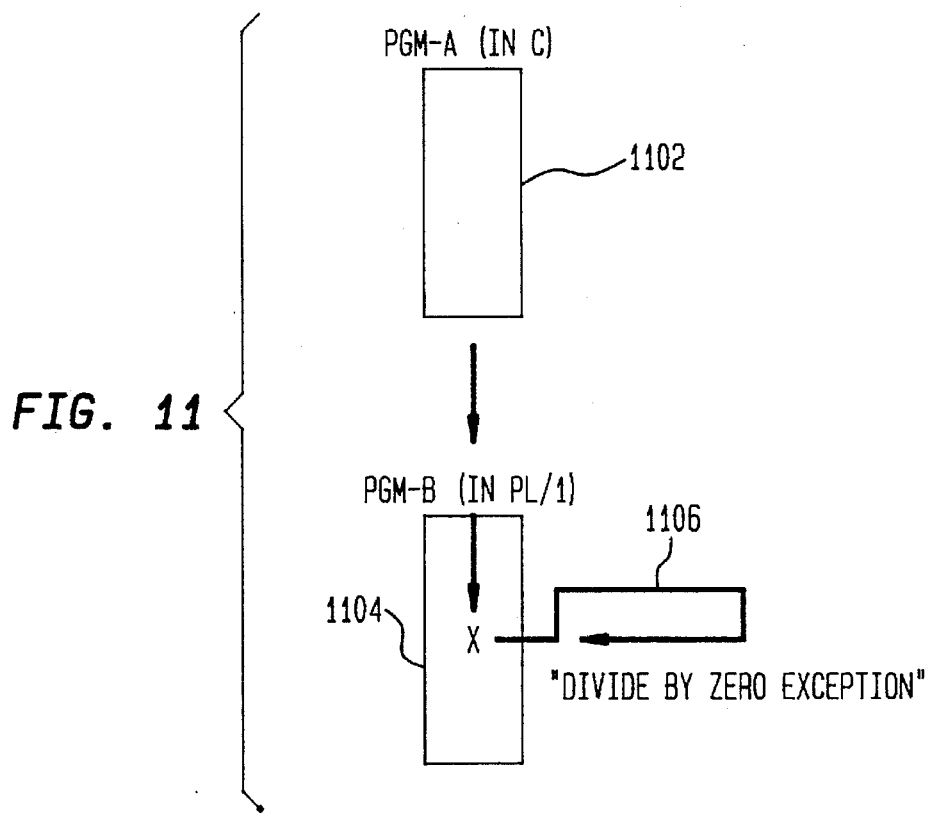
FIG. 11

SYSTEM AND METHOD FOR PROCESSING INTERPROCESS SIGNALS

This application is a continuation of application Ser. No. 08/195,718, filed Feb. 14, 1994, now abandoned.

DESCRIPTION

1. Technical Field

The present invention relates to systems and methods for supporting native and non-native signals which are transferred between processing entities of a computer program during execution of the computer program in a computer system.

2. Background Art

An operating system interface standard is a specification that defines the interface between operating systems which conform to the standard and application programs which are written to comply with the standard. Operating system interface standards are advantageous for a number of reasons, including enhanced portability. For example, applications which conform to an operating system interface standard are theoretically portable at the source code level to all computer systems having operating systems which conform to the standard. The portable operating system interface (POSIX) standard is an example of an operating system interface standard.

A computer programming language standard is a specification which defines the syntax and operation of a computer programming language. Various computer programming language standards exist, such as the ANSI and ISO standards for the C, COBOL, Fortran, and PL/I computer programming languages.

A signal (also called conditions, exceptions, and errors) is an interprocess message that is typically transferred via an interprocess communication (IPC) mechanism between processing entities of a computer program during execution of the computer program in a computer system. For example, often a "Divide By Zero" signal is sent to a processing entity when the processing entity attempts to perform a division operation with the divisor equal to zero.

Operating system interface standards usually specify the types of signals which are supported and the manner in which such signals are processed (for example, functions pertaining to the processing of signals are typically defined). These signal-related details are also usually specified by computer programming language standards. The signal specifications defined by computer programming language standards and operating system interface standards do not define the behavior of application programs which include components that conform to more than one of these standards. Consequently, the execution of such application programs is unpredictable.

This problem shall be described further with reference to FIG. 1, which is a high-level block diagram of a computer system 102. The computer system 102 includes hardware components 104 such as one or more central processing units (CPU) 106, a random access memory (RAM) 108, and an input/output (I/O) interface 110. The computer system 102 also includes an operating system 120. Various peripheral devices may be connected to the computer system 102, such as secondary storage devices 112 (such as a hard drive), input devices 114 (such as a keyboard and/or a mouse), display devices 116 (such as a monitor), and output devices 118 (such as printers).

A plurality of application programs 122, 124, 126 execute in the computer system 102. The application programs 122, 124, 126 may execute sequentially in the computer system 102, but preferably execute in parallel in the computer system 102.

The application program 122 includes a "C" component 128 that is written in the C computer programming language.

The application program 122 also includes a COBOL component 130, a Fortran component 132, and a PL/I component 134 that are written in the COBOL, Fortran, and PL/I computer programming languages, respectively. Thus, the application program 122 is a multi-language computer program. These components 128, 130, 132, 134 preferably execute in parallel with one another.

Assume that the operating system 120 conforms to an operating system interface standard which defines particular signal-related semantics. Also assume that these signal-related semantics are at least partially inconsistent with the signal-related semantics of the COBOL, Fortran, and PL/I computer programming languages (that is, the signal-related semantics of the computer programming language standards on which these programming languages are based). Assume that the signal-related semantics of the operating system 120 are consistent with those of the C computer programming language.

Suppose that a signal is sent from the operating system 120 to the COBOL component 130. There is uncertainty as to whether this signal should be processed according to the signal-related semantics of the COBOL programming language or the signal-related semantics of the operating system 120. Unpredictable execution behavior of the application program 122 results due to this uncertainty.

Suppose that a signal is sent from the Fortran component 132 to the COBOL component 130. In this case, there is uncertainty as to whether this signal should be processed according to the signal-related semantics of the Fortran programming language, the signal-related semantics of the COBOL programming language, or the signal-related semantics of the operating system 120. Thus, the uncertainty problem is magnified where a computer program has multi-language components, such as the application program 122 in FIG. 1.

A potential solution to this problem is to honor the signal-related semantics of one of the standards applicable to the languages used in the application program 122, or applicable to the operating system 120. However, this potential solution is not desirable, as it would either preclude multi-lingual applications or make any use of language specific signal handling elements to be unavailable or to behave unpredictably.

Thus, what is required is a method and system for defining the behavior of computer programs pertaining to the processing of signals where the computer programs execute in an environment where multiple signal handling semantics apply.

3. Disclosure of Invention

The present invention is directed to a method and system for processing a first type of interprocess signals (such as POSIX signals) and a second type of interprocess signals (such as non-POSIX signals) in a computer system. The first type of signals conform to a first signal handling standard (for example, the POSIX operating system interface standard) and the second type of signals conform to a second signal handling standard (for example, a computer programming language standard).

The present invention operates by determining whether an interprocess signal is a synchronous signal or an asynchronous signal (synchronous and asynchronous signals are described below). The interprocess signal originates from a first processing entity (such as a process or thread, described below) and is received by a second processing entity.

The interprocess signal is processed using signal handling semantics defined by the first signal handling standard if the interprocess signal is an asynchronous signal. Alternatively, the interprocess signal is processed using a combination of signal handling semantics defined by the first and second signal handling standards if the interprocess signal is a synchronous signal.

The present invention has a number of advantageous features. For example, the present invention ensures that signals are handled in a predictable and well defined manner. The present invention allows useful and complimentary use of multiple signal handling standards and specifications. The signal handling semantics employed by the present invention are consistent extensions of the POSIX and non-POSIX signal handling standards and specifications. Also, the present invention ensures that semantics of individual standards and specifications are kept intact when used individually.

Further features and advantages of the present invention, as well as the structure and operation of various embodiments of the present invention, are described in detail below with reference to the accompanying drawings. In the drawings, like reference numbers indicate identical or functionally similar elements.

The foregoing and other objects, features and advantages of the invention will be apparent from the following more particular description of (a) preferred embodiment(s) of the invention, as illustrated in the accompanying drawing(s).

BRIEF DESCRIPTION OF DRAWINGS

The present invention will be described with reference to the accompanying drawings, wherein:

FIGS. 10A–10C collectively illustrate a flowchart which depicts the manner in which the present invention selects a signal handling semantic for use in processing a synchronous signal;

FIG. 11 depicts a scenario pertaining to signals and is used to describe the flowchart of FIGS. 10A–10C; and FIGS. 12A–12D are used to describe "invocation stacks" and "stack frames," wherein FIGS. 12A and 12C illustrate example function invocation sequences and FIGS. 12B and 12D illustrate invocation stacks associated with the function invocation sequences of FIGS. 12A and 12C, respectively.

BEST MODE FOR CARRYING OUT THE INVENTION

1. Overview of the Present Invention

The present invention is directed to a method and system for defining the behavior of computer programs pertaining to the processing of interprocess signals where the computer programs execute in an environment where multiple signal handling semantics apply.

In particular, the present invention supports and enables the predictable processing of signals which are defined by the relevant operating system interface standard (that is, the operating system interface standard on which the operating system being used is based). Such signals are herein called "native" signals. The present invention also supports and enables the predictable processing of signals which are not defined by the relevant operating system interface standard (these signals may be defined by the pertinent computer program language standards). Such signals are herein called "non-native" signals. Thus, the present invention supports the predictable processing of both native and non-native signals.

As used herein, the term "interprocess signal" represents a signal that originates from one processing entity or event (such as a process or thread, described below) and that is received by another processing entity. The term "interprocess signal" also represents a signal that originates from one processing entity and that is received by the same processing entity. The terms "interprocess signal" and "signal" are used interchangeably herein.

Figure 1:
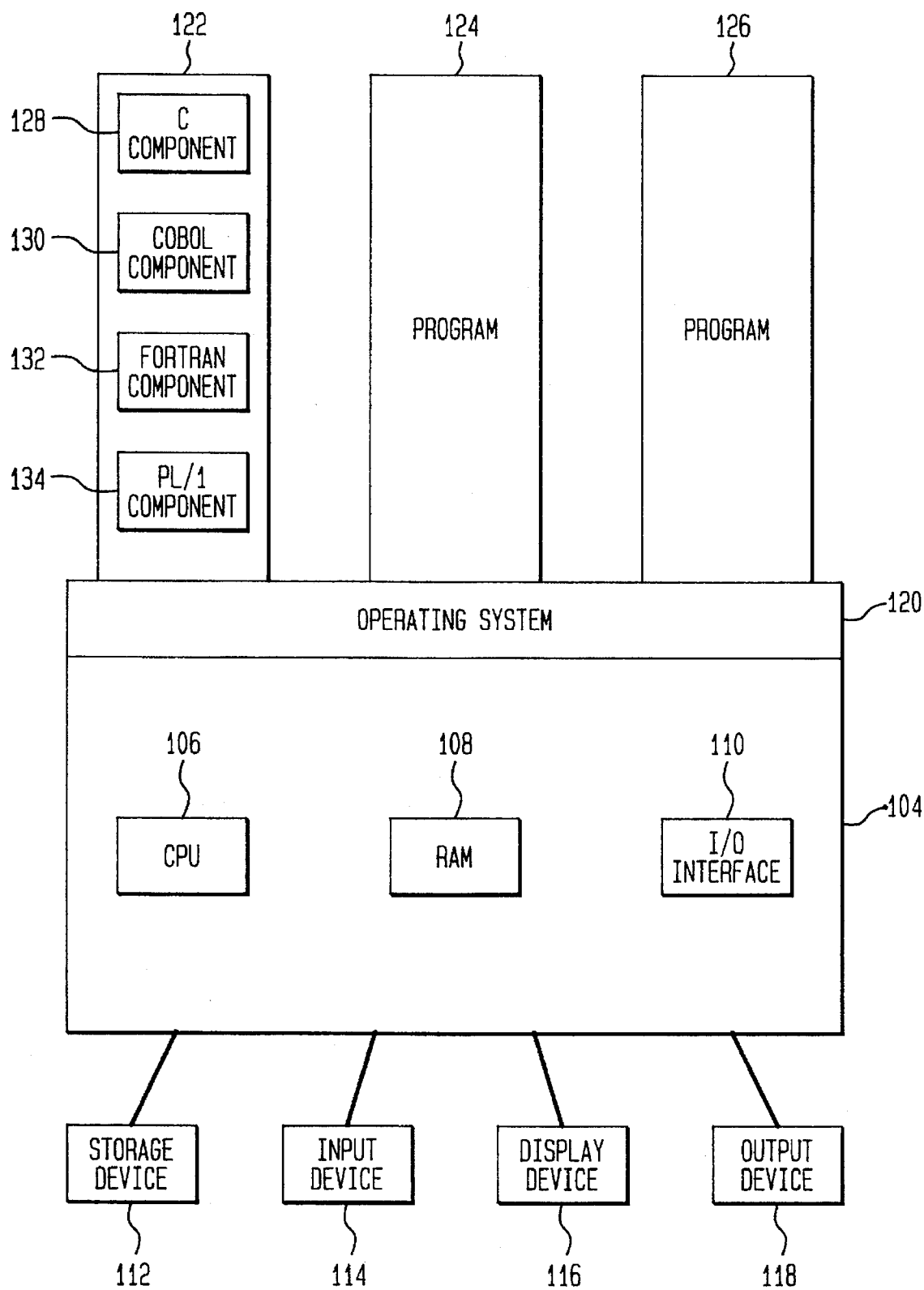
FIG. 1 is a block diagram of a conventional computer system used to illustrate the problems addressed by the present invention.
Figure 2:
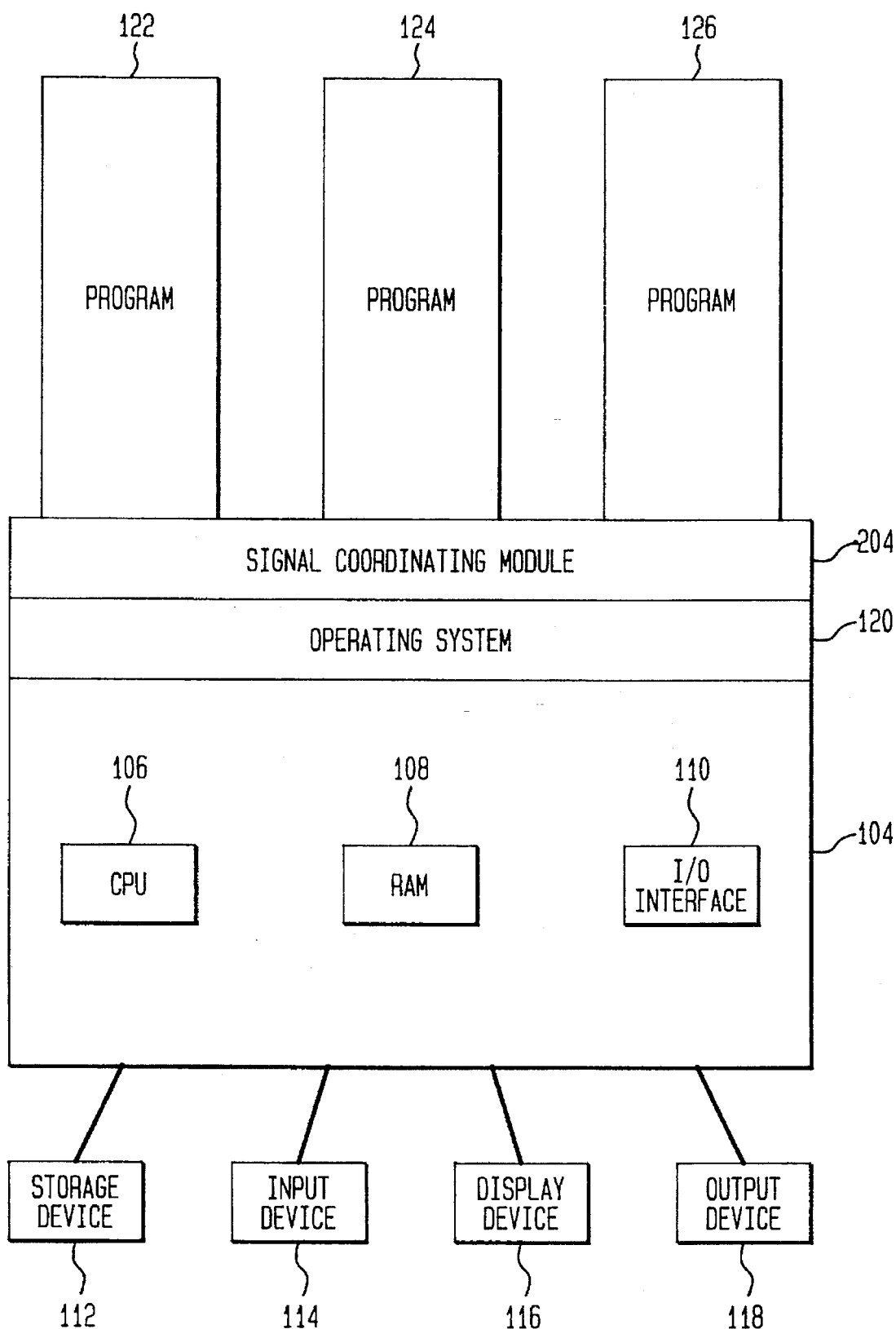
FIG. 2 is a block diagram of a computer system according to an embodiment of the present invention.

FIG. 2 is a block diagram of a computer system 202 according to an embodiment of the present invention. The computer system 202 is similar to the computer system 102 shown in FIG. 1, in that both computer systems 102 and 202 include hardware components 104 (such as one or more CPUs 106, a RAM 108, and an I/O interface 110), an operating system 120, and various peripheral devices (such as secondary storage devices 112, input devices 114, display devices 116, and output devices 118). Also, the same application programs 122, 124, 126 execute in both computer systems 102 and 202 (although as described herein the signal processing behavior of the application programs 122, 124, 126 is predictable with respect to the computer system 202, but unpredictable with respect to the computer system 102).

Unlike the computer system 102 of FIG. 1, however, the computer system 202 of FIG. 2 includes a signal coordinating module 204. Preferably, the signal coordinating module 204 implements the method of the present invention.

Specifically, the signal coordinating module 204 preferably supports and enables the predictable processing of native and non-native signals during the execution of the application programs 122, 124, and 126. For any particular signal, the signal coordinating module 204 determines whether the signal should be processed according to the standard associated with the operating system 120, according to one or more of the standards applicable to the languages used in the application programs 122, 124, 126, or according to a combination of the above.

The signal coordinating module 204 can be implemented in any number of ways. For example, the signal coordinating module 204 can be implemented as an extension of the operating system 120 (in which case the signal coordinating module 204 would be part of the operating system 120). Alternatively, the signal coordinating module 204 can be embedded in the run-time environment (not shown) of the application programs 122, 124, 126 which execute in the computer system 202. Alternatively, the signal coordinating module 204 can be implemented as an extension of a combination of the operating system 120 and the run-time environment. The signal coordinating module 204 could also be implemented as an application program which executes in the computer system 202, such as application program 126. These and other implementations of the signal coordinating module 204 will be apparent to persons skilled in the relevant art based on the description of the signal coordinating module 204 contained herein.

A computer program product comprising a computer readable media having computer program logic recorded thereon, wherein the computer program logic when executed in the computer system 202 enables the computer system 202 to implement the method of the present invention, may be read by and stored on the secondary storage device 112. The computer program logic may then be loaded into the RAM 108, and executed by the CPU 106 of the computer system 202. When executing in the CPU 106, the computer program logic is represented by the signal coordinating module 204, as shown in FIG. 2.

The system of the present invention is represented by the computer system 202 having the signal coordinating module 204. Alternatively, the system of the present invention is represented by the signal coordinating module 204 alone. Or, the system of the present invention is represented by the computer program product. Other representations of the present invention will be apparent to persons skilled in the relevant art based on the discussion contained herein.

Preferably, the computer system 202 is the well known System/390 family of computers produced by International Business Machines (IBM) Corporation of Armonk, N.Y. Preferably, a run-time environment is established in the computer system 202 using the well known SAA AD/Cycle Language Environment/370 produced by IBM (SAA stands for Systems Application Architecture; AD stands for Application Development). However, it should be understood that other computers and/or run-time environments could alternatively be used in the computer system 202 without departing from the scope and spirit of the present invention. System/390, SAA, and AD/Cycle are registered trademarks of International Business Machines Corporation.

2. Overview of the POSIX Operating System Interface Standard

Preferably, the operating system 120 in the computer system 202 is one which conforms to the Portable Operating System Interface (POSIX) standard. The POSIX standards relevant to the present invention are defined in terms of the well known C computer programming language.

POSIX, which is a UNIX based operating system interface standard, is described in many publicly available documents, such as *Information Technology-Portable Operating System Interface (POSIX) -Part 1: System Application Program Interface (API) (C Language)*, published by the Institute of Electrical and Electronics Engineers, International Standard ISO/IEC 9945-1:1990, IEEE Standard 1003.1-1990, 1990, and *Draft Standard for Information Technology-Portable Operating System Interface (POSIX)-Part 1: System Application Program Interface (API)-Amendment 2: Threads Extension (C Language)*, published by the Institute of Electrical and Electronics Engineers, IEEE Standard P1003.4a/D8, 1993, which are herein incorporated by reference in their entireties.

Specifically, the operating system 120 is preferably the well known MVS/ESA (Multiple Virtual Storage System/ Enterprise Systems Architecture) operating system produced by IBM. It should be understood, however, that other operating systems based on other operating system interface standards could alternatively be used without departing from the scope and spirit of the present invention. In particular, other UNIX based standards, specifications, or implementations could alternatively be used. MVS/ESA is a trademark of International Business Machines Corporation. UNIX is a registered trademark of American Telegraph and Telephone (AT&T).

Features of POSIX which are relevant to the present invention shall now be generally described. These features of POSIX are well known. They are discussed below for the convenience of the reader.

POSIX supports the following program execution constructs: processes and threads. A process is defined as including an address space, one or more threads that execute within that address space, and the system resources required by the threads. An application program includes one or more processes.

A thread is defined as being a single flow of control within a process. Each thread has its own required resources to support its flow of control.

POSIX supports a particular set of signals (such signals are called POSIX signals), and defines particular semantics for handling POSIX signals. Such semantics are called "POSIX signal handling semantics". They are also called "native signal handling semantics", since the operating system 120 which operates in the computer system 202 of the present invention conforms to these semantics.

According to the POSIX signal handling semantics, signals are defined as being asynchronous. In contrast, traditional language signal handling semantics define signals as being synchronous. Asynchronous signals can best be described by first describing synchronous signals.

A synchronous signal is one whose origin can be attributed to a specific thread (this is called the originating thread), wherein the originating thread and the receiving thread (that is, the thread which received the signal from the originating thread) execute synchronously. In other words, with synchronous signals, the execution of the originating thread is suspended while the receiving thread is executing.

These assumptions pertaining to synchronous signals do not apply to asynchronous signals. In particular, the execution of the originating thread is not suspended while the receiving thread is executing. In contrast, with asynchronous signals, the originating thread and the receiving thread may execute in parallel.

Referring to FIG. 1, it is assumed that the C component 128 in the multi-language application program 122 is written in accordance with the POSIX standard. Thus, the C component 128 generates POSIX signals. The language standards on which the COBOL component 130, the Fortran component 132, and the PL/I component 134 are based are assumed to be at least partially inconsistent with POSIX (at least with regard to signal handling semantics). Thus, these components 130, 132, 134 can generate non-POSIX signals as well as POSIX signals (such as those caused by program exceptions recognized by POSIX). The manner in which the present invention supports and enables the predictable processing of these POSIX (or native) signals and non-POSIX (or non-native) signals is described below.

3. Operation of the Present Invention

The operation of the present invention shall now be described with reference to the flowcharts contained in FIGS. 3, 4, and 10A–10C. These flowcharts are of sufficient detail to enable one skilled in the relevant art to generate a computer program or a computer program product in accordance with the present invention.

Figure 3:
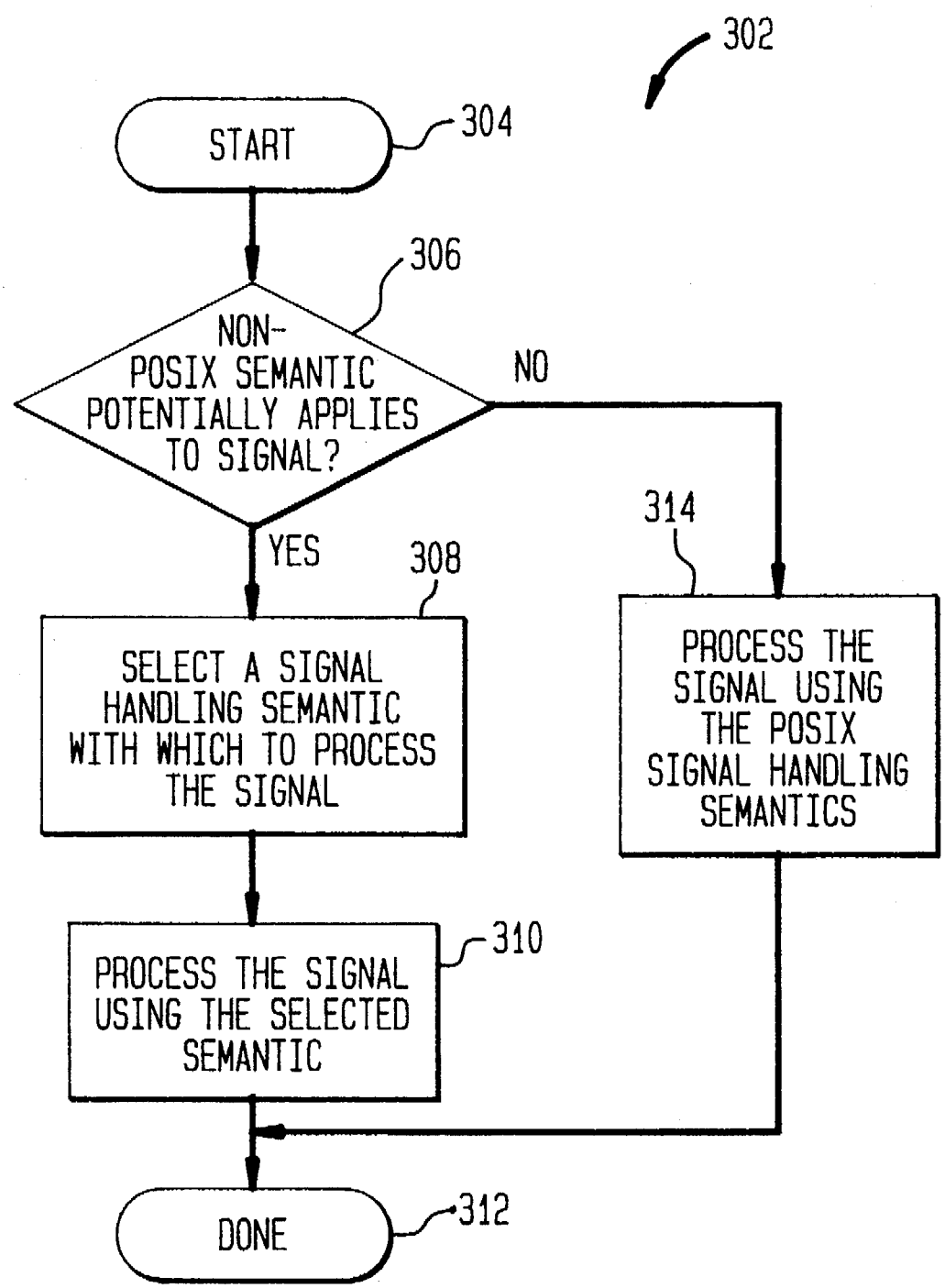
FIG. 3 is a flowchart depicting the manner in which the present invention predictably processes native and non-native signals.

Referring first to FIG. 3, FIG. 3 illustrates a flowchart 302 which depicts the high level operation of the signal coordinating module 204 according to a preferred embodiment of the present invention. The steps of the flowchart 302 are applied on a per signal basis. The signal under consideration may be either a POSIX signal or a non-POSIX signal (as discussed above with reference to the multi-language program 122 in FIGS. 1 and 2, for example).

In essence, while performing the steps of the flowchart 302, the signal coordinating module 204 identifies and selects a signal handling semantic which is applicable to the signal under consideration. This signal handling semantic may be one that is defined by the operating system interface standard in use (preferably, the POSIX standard), or one defined by the pertinent programming language standards. Then, the signal coordinating module 204 uses the selected signal handling semantic to process the signal.

The flowchart 302 of FIG. 3 shall now be described in greater detail. In the flowchart 302, control begins at step 304 and immediately passes to step 306.

In step 306, the signal coordinating module 204 determines whether a non-POSIX signal handling semantic potentially applies to the signal under consideration. As discussed above, the signal under consideration may be either a POSIX signal or a non-POSIX signal. If the signal is a non-POSIX signal, then clearly a non-POSIX signal handling semantic would apply to the processing of the signal. However, according to the present invention, if the signal is a POSIX signal, then either a POSIX signal handling semantic or a non-POSIX signal handling semantic may apply to the processing of the signal. (It should be understood that certain events, such as some program exceptions, are recognized by both POSIX and some non-POSIX standards. For purposes of the present invention, such events are preferably classified and processed as POSIX signals.)

Specifically, the inventors have determined that a POSIX signal may be treated as a synchronous signal for purposes of signal handling (such that a non-POSIX signal handling semantic may potentially apply) if the following two conditions are satisfied: (1) the originating thread (that is, the thread which generated the signal) is also the receiving thread; and (2) the receiving thread received the signal prior to continuation of execution of the originating thread beyond the point where the originating thread generated the signal (in other words, the signal was not "blocked" at the time of the signal generation). If both of these conditions are not satisfied, then the POSIX signal is an asynchronous signal such that only POSIX signal handling semantics are applied to the processing of the signal.

If, in step 306, the signal coordinating module 204 determines that a non-POSIX signal handling semantic does not potentially apply to the signal under consideration, then step 314 is executed.

In step 314, the signal coordinating module 204 processes the signal using POSIX signal handling semantics. Such POSIX signal handling semantics are well known and are described in many publicly available documents, such as *Information Technology-Portable Operating System Interface (POSIX)-Part 1: System Application Program Interface (API) (C Language)* and *Draft Standard for Information Technology-Portable Operating System Interface (POSIX)-Part 1: System Application Program Interface (API)-Amendment 2: Threads Extension (C Language)*, cited above. After executing step 314, the processing of the signal is complete, as indicated by step 312.

If, in step 306, the signal coordinating module 204 determines that non-POSIX signal handling semantics potentially apply to the signal under consideration, then the series of steps beginning with step 308 are executed.

In step 308, the signal coordinating module 204 selects a signal handling semantic with which to process the signal. This signal handling semantic may be one that is defined by POSIX, or one defined by the pertinent programming language standards.

Generally, step 308 is performed as follows. Semantics directed to ignoring the signal are applied. If such semantics do not exist, then signal handling semantics scoped to a specific invocation stack frame are applied. If such semantics do not exist, then semantics directed to performing an explicit action (such as invoking a routine to handle the signal) are applied. If such semantics do not exist, then default signal handling semantics are applied. This hierarchy of signal handling semantics is discussed in greater detail below.

Thereafter, in step 310, the signal coordinating module 204 uses the signal handling semantic selected in step 308 to process the signal. After executing step 310, the processing of the signal is complete, as indicated by step 312.

Step 306 of FIG. 3 shall now be described in greater detail with reference to a flowchart 402 in FIG. 4. The flowchart 402 begins with step 404, where control immediately passes to step 406.

In step 406, the signal coordinating module 204 determines whether the interrupted thread is the same as the thread which originated the signal (that is, the originating thread). The interrupted thread, which is also called the receiving thread, is the thread which received the signal. If the interrupted thread is not the same as the originating thread, then step 414 is performed.

In step 414, the signal coordinating module 204 concludes that the signal is an asynchronous signal (equivalently, the signal coordinating module 204 concludes that a non-POSIX signal handling semantic does not potentially apply to the signal). After performing step 414, execution of the flowchart 402 of FIG. 4 is complete as indicated by step 412. As a result of the determination that the signal is an asynchronous signal, the signal coordinating module 204 processes the signal using POSIX signal handling semantics, as described above (see step 314 in FIG. 3).

If in step 406 the signal coordinating module 204 determines that the interrupted thread is the same as the receiving thread, then the series of steps beginning with step 408 are performed.

In step 408, the signal coordinating module 204 determines whether the interrupt point is the same as the point of origination of the signal. If the interrupt point is not the same as the point of origination of the signal, then the series of steps beginning with step 414 are performed, as described above. If, instead, the signal coordinating module 204 determines in step 408 that the interrupt point is the same as the point of origination of the signal, then step 410 is performed.

In step 410, the signal coordinating module 204 concludes that the signal can be treated as a synchronous signal (equivalently, the signal coordinating module 204 concludes that non-POSIX signal handling semantics potentially apply to the signal). After performing step 410, execution of the flowchart 402 of FIG. 4 is complete as indicated by step 412. As a result of the determination that the signal can be treated as a synchronous signal, the signal coordinating module 204 processes the signal using a mixture of POSIX and non-POSIX signal handling semantics, as described above (see steps 308 and 310 in FIG. 3).

The flowchart 402 in FIG. 4 shall now be further described with reference to the examples shown in FIGS. 5–9. In FIG. 5, a signal 508 has been generated by an event 506 which is external to a thread 504 which has received the signal 508 at an interrupt point 510. The thread 504 is part of a process 502. The signal 508 is asynchronous since the interrupted thread 504 is not the same as the originating thread, which in this case is represented by the external event 506 (see step 406 in FIG. 4).

Figure 6:
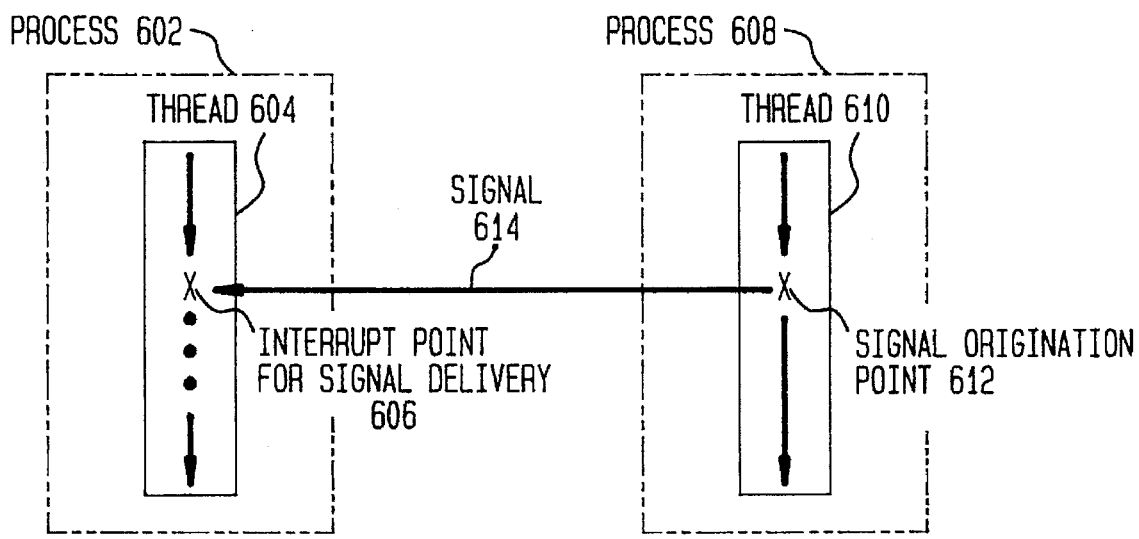

In FIG. 6, a signal 614 has been generated by a thread 610 (at a signal origination point 612) in a process 608 and has been received by a thread 604 (at an interrupt point 606) in another process 602. This signal 614 is asynchronous since the interrupted thread 604 is not the same as the originating thread 610 (step 406 in FIG. 4).

Figure 7:
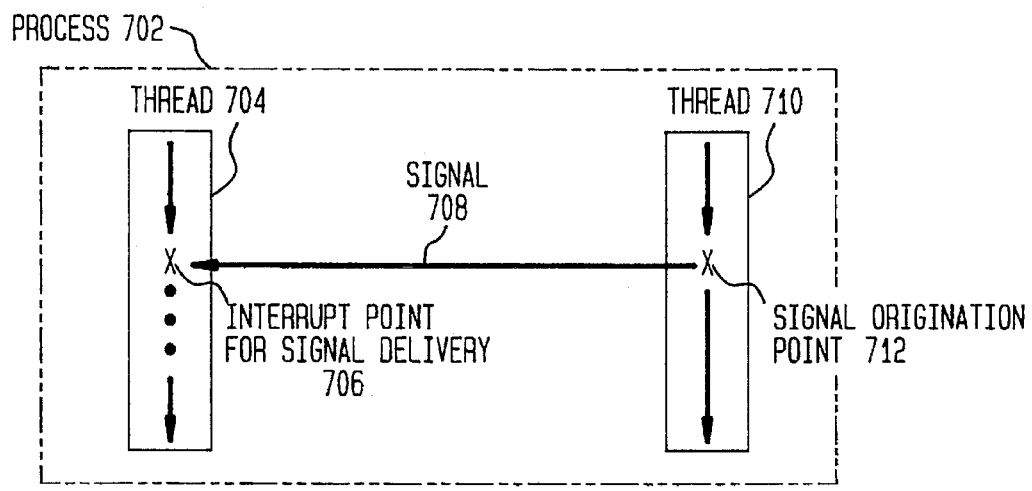

In FIG. 7, a signal 708 has been generated by a thread 710 (at a signal origination point 712) and has been received by a thread 704 (at a signal interrupt point 706). Both threads 704, 710 are part of a process 702. This signal 708 is asynchronous since the interrupted thread 704 is not the same as the originating thread 710 (step 406 in FIG. 4).

Figure 8:
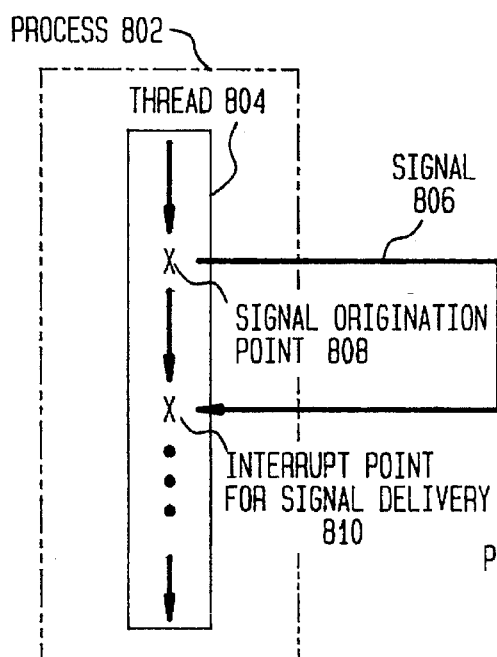

In FIG. 8, a signal 806 has been generated by a thread 804 (in a process 802) and has been received by the same thread 804. Thus, the first condition for a signal to be a synchronous signal, that the interrupted thread be the same as the originating thread, is satisfied (step 406 in FIG. 4). However, the interrupt point 810 is not the same as the point of origination 808 of the signal 806 (see step 408 of FIG. 4). In other words, the signal 806 was received by the thread 804 at an interrupt point 810 that is displaced in time from the origination point 808 of the signal 806 (the signal 806 may have been blocked at origination, for example). Thus, this signal 806 is asynchronous.

Figure 9:
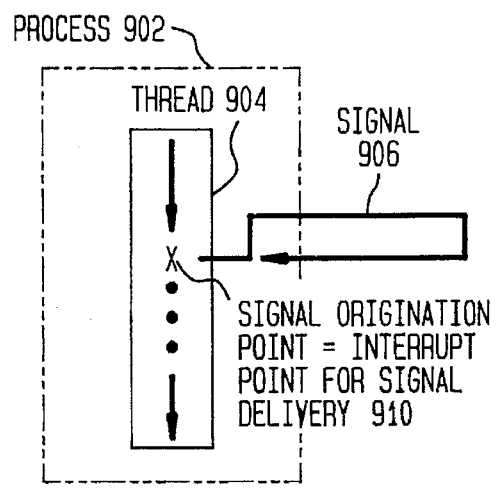

In FIG. 9, a signal 906 has been generated by a thread 904 (in a process 902) and has been received by the same thread 904. Also, the interrupt point 910 is the same as the point of origination 910 of the signal 906. Thus, this signal 906 is synchronous.

There are various alternative approaches for determining whether a signal should be treated as being a synchronous or asynchronous signal. According to one alternative approach, the decision of whether a signal should be treated as synchronous is based on the POSIX signal type regardless of how the signal was generated or received. Under this approach, for example, a POSIX signal SIGFPE (which represents an erroneous arithmetic operation) is defined as being a synchronous signal and a POSIX signal SIGKILL (terminate the target process) is defined as being an asynchronous signal.

Another alternative approach is to decide if a signal is to be treated as asynchronous or synchronous based on how the signal was generated. For example, a signal is asynchronous if it was generated by the following POSIX C functions: kill() or pthread_kill(), or if it was generated as a result of an external hardware event. A signal is synchronous if it was generated by the following POSIX C function: raise(), or if it was generated from any non-POSIX functions or as a result of a program exception.

Step 308 of FIG. 3 shall now be described in greater detail with reference to a flowchart 1002 in FIGS. 10A–10C. The flowchart 1002 begins with step 1004, where control immediately passes to step 1006.

In step 1006, the signal coordinating module 204 determines whether the signal being considered is a POSIX signal (that is, a signal that is defined and recognized by the POSIX standard). If the signal is not a POSIX signal, then the series of steps beginning with step 1024 (FIG. 10B) are processed, as discussed below. This processing path is indicated by flowchart connectors "X" in FIGS. 10A and 10B. If the signal is a POSIX signal, then the signal coordinating module 204 initially attempts to process the signal using selected POSIX signal handling semantics. Such processing by the signal coordinating module 204 is represented by steps 1008, 1010, 1012, 1016, 1018, and 1020.

Before considering these steps in detail, however, it will be illustrative to consider another feature of POSIX: signal actions. In POSIX, a signal action is associated with each signal. The signal action of a signal specifies what a process should do upon receipt of the signal. POSIX defines three types of signal actions: "IGNORE", function pointer, and default.

The "IGNORE" signal action instructs the receiving process to ignore the signal. The function pointer signal action instructs the receiving process to execute the function addressed by the function pointer (assuming that another signal handling semantic does not override this POSIX semantic). There are various types of default signal actions, such as "STOP", which stops the execution of the receiving process.

Steps 1008, 1010, 1012, 1016, 1018, and 1020 shall now be discussed.

In step 1008, the signal coordinating module 204 determines whether the signal action associated with the signal is equal to "IGNORE". If the signal action is equal to "IGNORE", then the signal coordinating module 204 in step 1016 instructs the receiving thread to ignore the signal. The processing of the signal is complete after the execution of step 1016, as indicated by step 1022.

Returning to step 1008, if the signal action is not equal to "IGNORE", then the signal coordinating module 204 executes the series of instructions beginning with step 1010. In step 1010, the signal coordinating module 204 determines whether the signal action associated with the signal is equal to "STOP" or "CONTINUE". If the signal action is equal to "STOP", then the signal coordinating module 204 in step 1018 stops the execution of the receiving thread. This action of the signal coordinating module 204 has effect only if the receiving thread is not already stopped.

If the signal action is equal to "CONTINUE", then the signal coordinating module 204 in step 1018 continues the execution of the receiving thread. This action of the signal coordinating module 204 has effect only if the receiving thread is not already executing. For example, this action of the signal coordinating module 204 has effect if the receiving thread was blocked prior to receiving the signal.

The processing of the signal is complete after the execution of step 1018, as indicated by step 1022.

Returning to step 1010, if in step 1010 it was determined that the signal action was not equal to "STOP" or "CONTINUE", then the series of steps beginning with step 1012 are executed. In step 1012, the signal coordinating module 204 determines whether the default signal action associated with the signal is equal to "TERMINATE", and whether the signal is of such a priority that it cannot be ignored or caught. That is, whether the signal is of such a priority that its signal action, if equal to "IGNORE" or a function pointer, should be ignored in favor of the "TERMINATE" signal action.

If the default signal action is equal to "TERMINATE", and if the signal is of such a priority that it cannot be ignored or caught, then the signal coordinating module 204 in step 1020 terminates the receiving process. The processing of the signal is complete after the execution of step 1020, as indicated by step 1022.

Figure 10A:
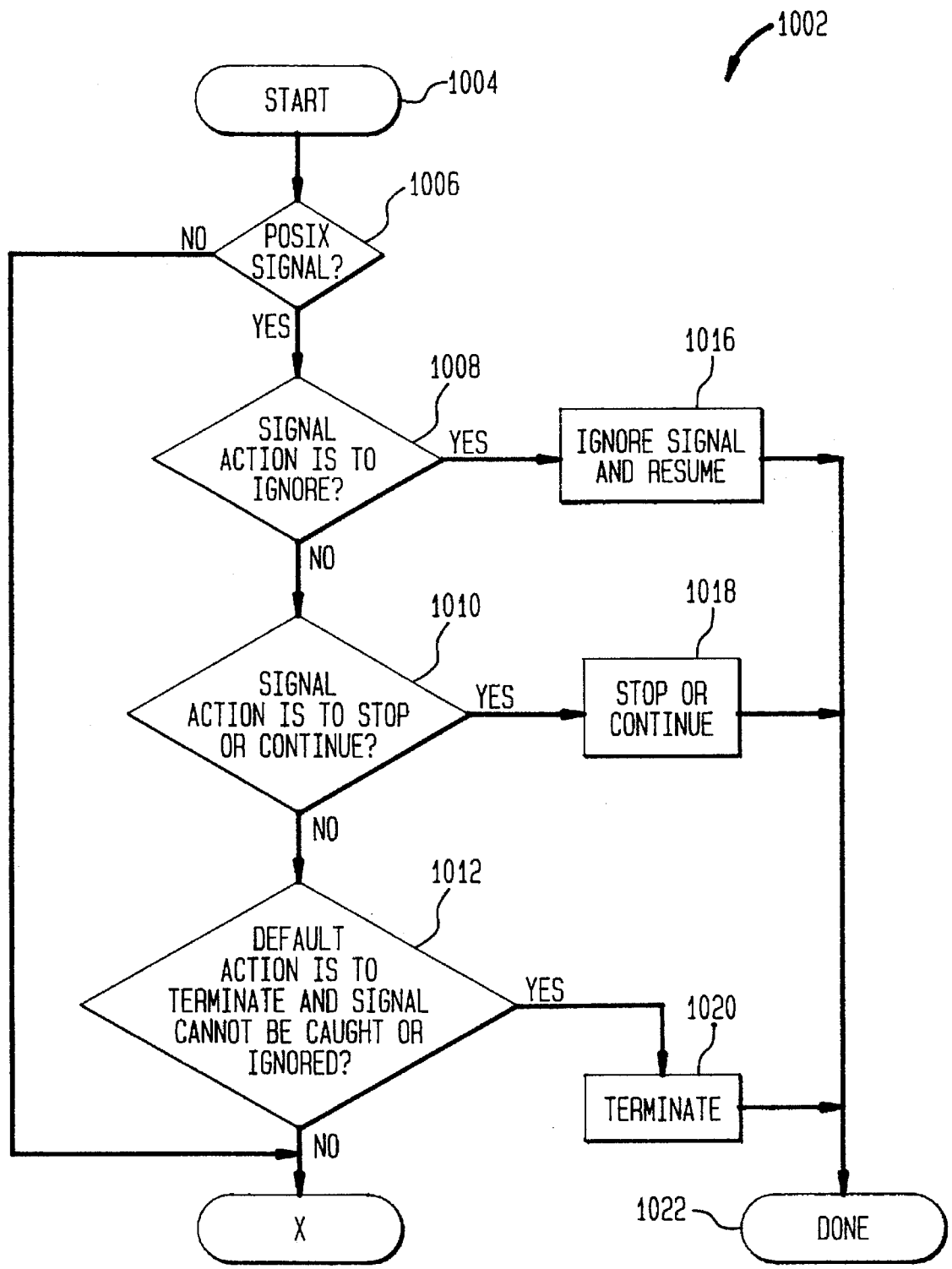
Figure 10B:
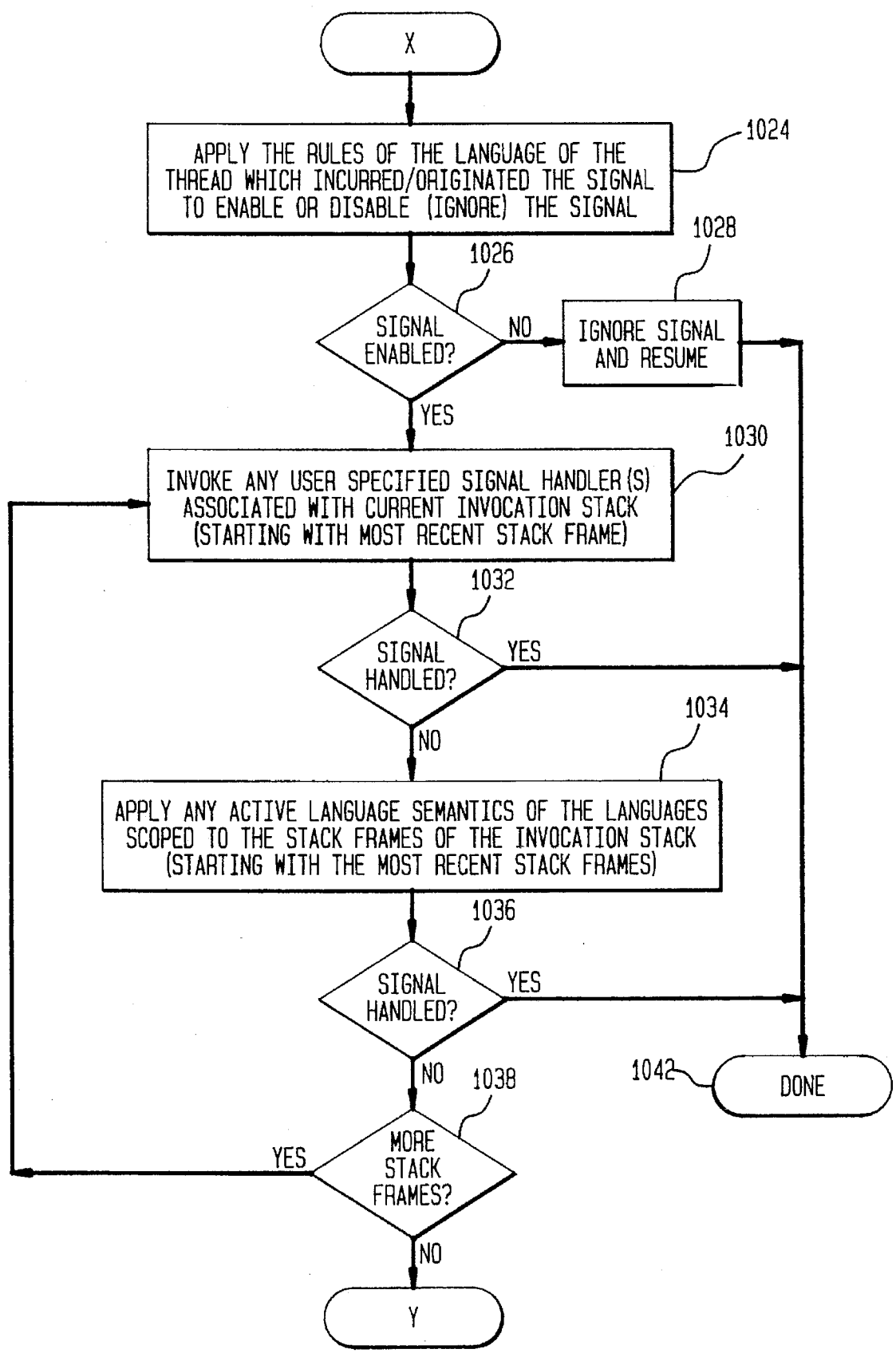

Returning now to step 1012, if the default signal action is not equal to "TERMINATE", and/or the signal is not of such a priority that it cannot be ignored or caught, then the series of steps beginning with step 1024 are executed (see FIG. 10B). This processing path is indicated by flowchart connectors "X" in FIGS. 10A and 10B.

Figure 4:
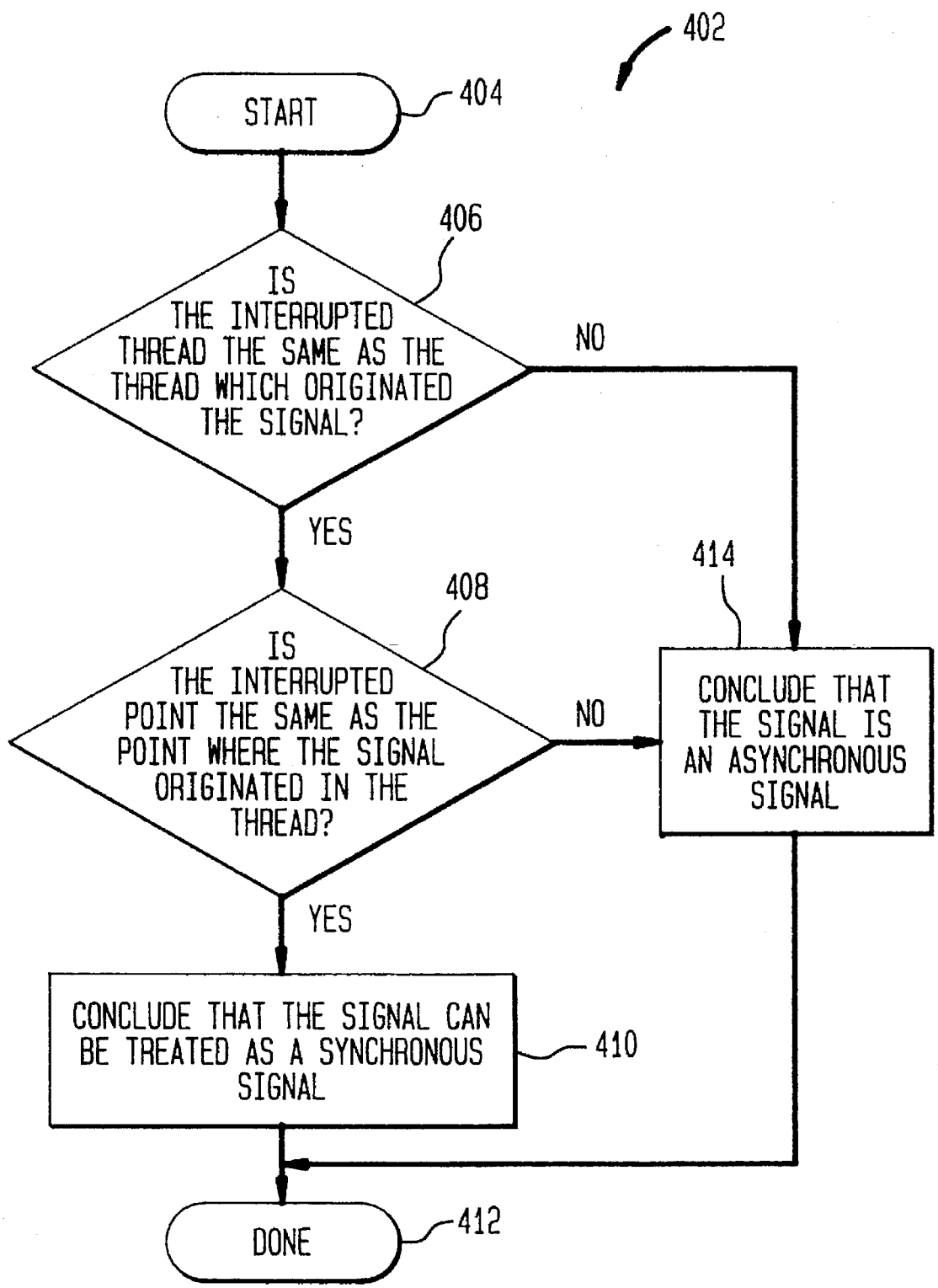
FIG. 4 is a flowchart depicting the manner in which the present invention determines whether a signal is asynchronous or synchronous.
Figure 5:
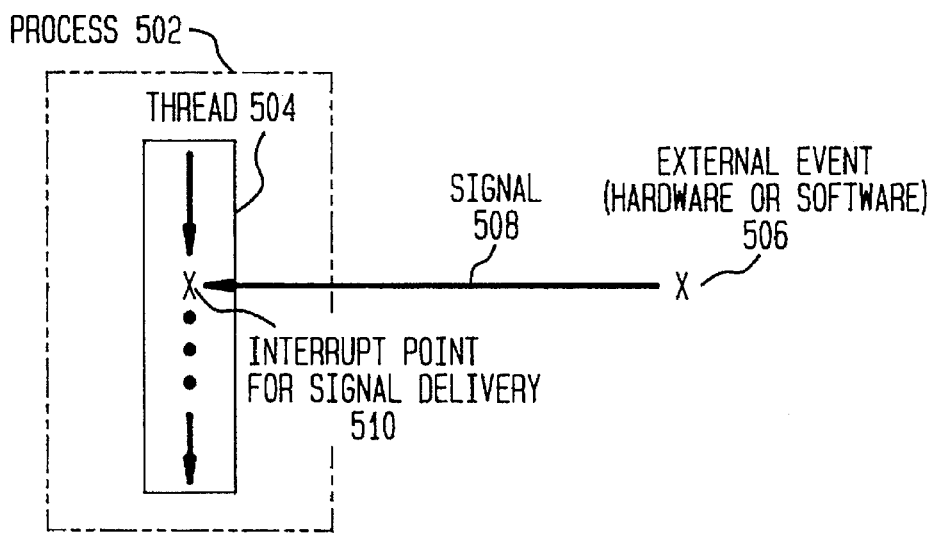
FIGS. 5–9 depict various scenarios pertaining to signals and are used to describe the flowchart of FIG. 4.

In step 1024, the signal coordinating module 204 applies the rules of the language of the stack frame of the thread which originated and received the signal to determine whether to enable or disable the signal (recall that the signal being processed is a synchronous signal, and that a synchronous signal is a signal that originated and was received by the same thread—see step 406 in FIG. 4). Computer programming languages may differ as to whether they consider a particular condition to be a special event, that is, to be a signal. For example, a divide by zero condition may be a special event (and thus be a signal) in some languages, but not in other languages. Thus, in step 1024, the signal coordinating module 204 determines whether the signal should be processed (that is, enabled) or ignored (that is, disabled) by applying the rules of the language of the stack frame of the thread which originated and received the signal.

In step 1026, the signal coordinating module 204 determines whether the signal is disabled according to the results of step 1024. If in step 1026 the signal coordinating module 204 determines that the signal is disabled, then the signal coordinating module 204 in step 1028 ignores the signal and instructs the thread which originated and received the signal to resume execution. The processing of the signal is complete after the execution of step 1028, as indicated by step 1042.

Returning to step 1026, if the signal coordinating module 204 determines that the signal is enabled, then the series of steps beginning with step 1030 are executed. In these steps, the signal coordinating module 204 processes the signal using POSIX and non-POSIX signal handling semantics. Some of these steps involve analysis of an invocation stack and stack frames contained within the invocation stack. While they are generally well known, it will be useful to define the terms "invocation stack" and "stack frame" before proceeding further.

Figure 12A:
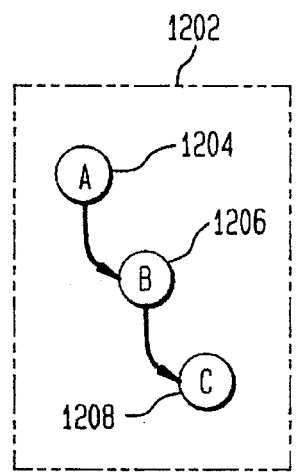

FIG. 12A illustrates an example function invocation sequence where a function A 1204 has invoked a function B 1206. Function B 1206 has, in turn, invoked a function C 1208. Functions A 1204, B 1206, and C 1208 are part of a thread 1202.

There is an invocation stack associated with each thread. An invocation stack is a last-in-first-out (LIFO) stack. The elements of an invocation stack are called stack frames. Each stack frame is associated with one function invocation.

A function uses its stack frame to store its dynamic variables. Other information pertaining to a function is stored in its stack frame, such as information identifying any user-specified signal handlers, and information which identifies the programming language with which the function was written. Such information is said to be "scoped" to the function. Equivalently, such information is said to be scoped to the stack frame associated with the function.

Figure 12C:
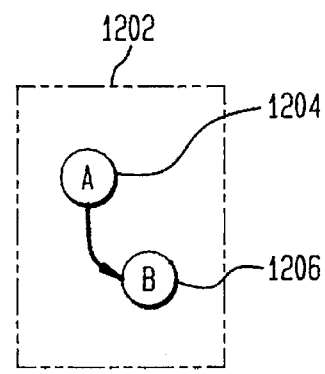
Figure 12B:
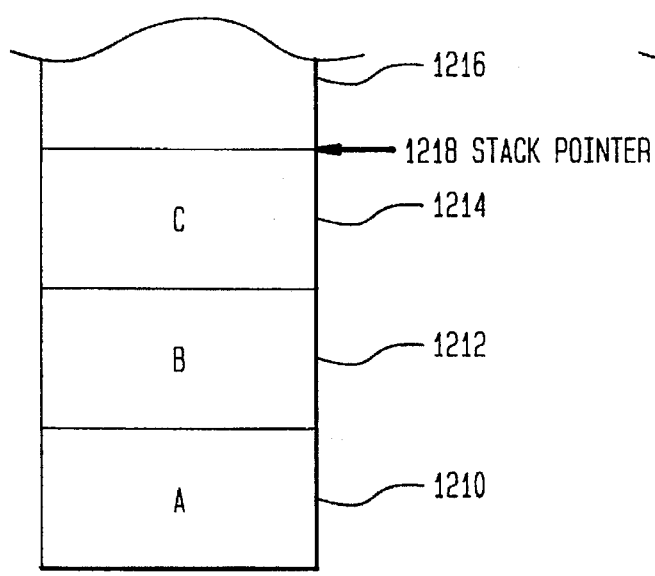

FIG. 12B illustrates an invocation stack 1216 which is associated with the invocation sequence of FIG. 12A. The invocation stack 1216 includes stack frames 1210, 1212, and 1214 for the invocations of functions A 1204, B 1206, and C 1208, respectively. The stack frame 1214 for function C 1208 is at the stop of the invocation stack 1216, as indicated by a stack pointer 1218.

Figure 12D:
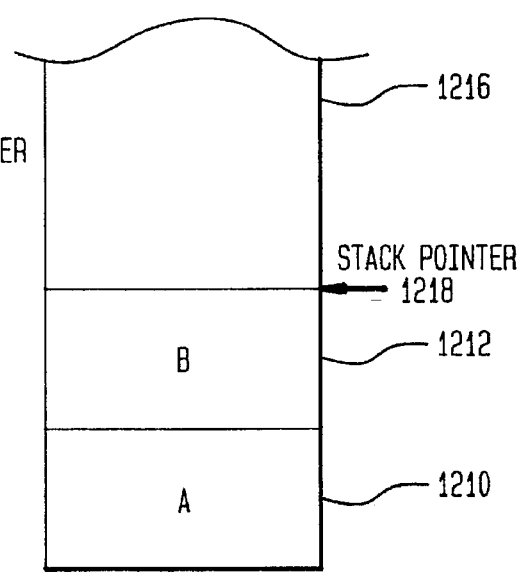

A stack frame is added to an invocation stack when a function is invoked. Similarly, a stack frame associated with a function is removed from the invocation stack when the function returns to its caller. This is shown, for example, in FIGS. 12C and 12D, where the stack frame 1214 for function C 1208 has been removed from the invocation stack 1216 after the function C 1208 has returned to its caller, function B 1206.

Referring again to FIG. 10B, in step 1030 the signal coordinating module 204 attempts to process the signal using any user specified signal handlers associated (that is, registered) with the invocation stack for the thread which originated and received the signal. The signal coordinating module 204 performs this function starting with the most recent stack frame (that is, the stack frame at the top of the invocation stack).

Consider, for example, the invocation stack 1216 shown in FIG. 12B. During the first iteration of the loop comprising steps 1030, 1032, 1034, 1036, and 1038, the signal coordinating module 204 in step 1030 attempts to process the signal using any user specified signal handlers associated with the stack frame 1214 for function C 1208 (which is at the top of the invocation stack 1216). During subsequent iterations of this loop, the signal coordinating module 204 in step 1030 attempts to process the signal using any user specified signal handlers associated with the next stack frame in the invocation stack 1216.

After step 1030, the signal coordinating module 204 in step 1032 determines whether the signal was processed in step 1030. If the signal coordinating module 204 determines that the signal was processed in step 1030, then the signal coordinating module 204 concludes that the processing of the signal is complete, as indicated in step 1042. If, instead, the signal coordinating module 204 determines that the signal was not processed in step 1030, then the series of steps beginning with step 1034 are performed.

It is noted that the signal would not have been processed if there were no user specified signal handlers associated with the stack frame considered in the current iteration of step 1030. It is also noted that, even if such a user specified signal handler existed, this signal handler might specify that the signal be "percolated" (that is, handled by some other signal handling semantic). In this case, the signal coordinating module 204 in step 1032 would determine that the signal had not been handled in step 1030, and would process step 1034.

In step 1034, the signal coordinating module 204 attempts to process the signal using any language semantics associated with the invocation stack for the thread which originated and received the signal. The signal coordinating module 204 performs this function starting with the most recent stack frame (that is, the stack frame at the top of the invocation stack).

Consider, for example, the invocation stack 1216 shown in FIG. 12B. During the first iteration of the loop comprising steps 1030, 1032, 1034, 1036, and 1038, the signal coordinating module 204 in step 1034 attempts to process the signal using any signal handling semantics of the computer programming language associated with the stack frame 1214 for function C 1208 (that is, the language which was used to write function C). During subsequent iterations of this loop, the signal coordinating module 204 in step 1034 attempts to process the signal using any signal handling semantics of the computer programming language associated with the next stack frame in the invocation stack 1216.

After step 1034, the signal coordinating module 204 in step 1036 determines whether the signal was processed in step 1034. If the signal coordinating module 204 determines that the signal was processed in step 1034, then the signal coordinating module 204 concludes that the processing of the signal is complete, as indicated in step 1042. If, instead, the signal coordinating module 204 determines that the signal was not processed in step 1034, then the series of steps beginning with step 1038 are performed.

It is noted that the signal would not have been processed if there were no signal handling semantics of the computer programming language associated with the stack frame considered in the current iteration of step 1034. It is also noted that, even if such a signal handling semantic existed, this handling semantic might specify that the signal be percolated. In this case, the signal coordinating module 204 in step 1036 would determine that the signal had not been handled in step 1034, and would process step 1038.

In step 1038, the signal coordinating module 204 determines whether there are any more stack frames in the invocation stack for the originating and receiving thread which have not yet been considered in steps 1030 and 1034. If there are such stack frames, then the series of steps beginning with step 1030 are re-processed (that is, the next iteration of steps 1030, 1032, 1034, 1036, and 1038 begins). Otherwise, the series of steps beginning with step 1044 are processed (see FIG. 10C). This processing path is indicated by flowchart connectors "Y" in FIGS. 10B and 10C.

In step 1044, the signal coordinating module 204 determines whether the signal is a POSIX signal. If the signal is a POSIX signal, then the series of steps beginning with step 1050 are performed.

In step 1050, the signal is processed in accordance with its POSIX signal action. For example, the signal action may be to invoke a signal catcher (that is, a signal handling function) addressed by a function pointer to process the signal. The POSIX actions performed in step 1050 are different from those which would have been performed in steps 1016, 1018, or 1020 had such actions been applicable to the signal (otherwise, the action specified in step 1016, 1018, or 1020 would have been performed, and step 1050 would never have been reached). Processing of the signal is complete after the execution of step 1050, as indicated by step 1048.

Returning now to step 1044, if the signal coordinating module 204 determined that the signal was not a POSIX signal, then the series of steps beginning with step 1046 are performed.

In step 1046, the signal coordinating module 204 processes the signal according to the default semantics of the language of the thread which originated and received the signal. Such default semantics refer to action which is taken when no action is applied in any of the preceding steps. A typical default action is to report the condition represented by the signal and either to ignore the signal or to terminate the thread and/or the process which originated and received the signal. Processing of the signal is complete after the execution of step 1046, as indicated by step 1048.

The operation of the present invention according to the flowchart 1002 in FIGS. 10A–10C shall now be further illustrated by considering a number of examples. These examples are based on the scenario shown in FIG. 11, where a Program A (Pgm-A) 1102 calls a Program B (Pgm-B) 1104 (these programs represent threads in a process). Program A 1102 is written in "C" and Program B 1104 is written in PL/I. Program B 1104 originates and receives a "divide by zero" exception, which maps to a POSIX signal "SIGFPE" 1106. In the scenario of FIG. 11, the SIGFPE signal 1106 can be treated as a synchronous signal (see FIG. 9).

In a Case 1, assume that the following signal handling specification is in effect: the POSIX signal action for SIG-FPE is to ignore the signal. According to step 1008, this signal 1106 is ignored regardless of any other signal handling semantics which might apply to the signal 1106.

In a Case 2, assume that the following signal handling specifications are in effect: (1) the POSIX signal action for SIGFPE is to invoke a specified signal catcher routine; (2) PL/I defines an "ON ZERODIVIDE" signal handling function and this function is scoped to the stack frame of Program B 1104; and (3) PL/I considers a divide by zero exception to be a signal.

For Case 2, the POSIX semantics specified in steps 1016, 1018, and 1020 do not apply because the signal action for the SIGFPE signal is not "IGNORE", "STOP", "CONTINUE", or "TERMINATE" (with the signal being of such a priority that it cannot be caught or ignored). The signal 1106 is enabled in step 1024 since PL/I considers a divide by zero exception to be a signal. The signal 1106 is not processed in step 1030 since there are no user specified signal handlers associated with Program B 1104 or Program A 1102. The signal 1106 is processed in step 1034, however, since PL/I defines an "ON ZERODIVIDE" signal handling function and this function is scoped to the stack frame of Program B 1104.

In a Case 3, assume that the following signal handling specifications are in effect: (1) the POSIX signal action for SIGFPE is to terminate the process (but the priority of the signal 1106 is not so high that it cannot be ignored or caught); and (2) PL/I considers a divide by zero exception to be a signal.

For Case 3, the POSIX semantics specified in steps 1016, 1018, and 1020 do not apply because the signal action for the SIGFPE signal is not "IGNORE", "STOP", "CONTINUE", or "TERMINATE" (note that the "TERMINATE" option of steps 1012 and 1020 does not apply since, as noted above, the priority of the signal 1106 is not so high that the signal 1106 cannot be caught or ignored). The signal 1106 is enabled in step 1024 since PL/I considers a divide by zero exception to be a signal. The signal 1106 is not processed in step 1030 since there are no user specified signal handlers associated with Program B 1104 or Program A 1102. The signal 1106 is not processed in step 1034 since PL/I does not define any semantics to process the signal 1106. The signal 1106 is processed in step 1050, however, according to the POSIX "terminate" signal action.

In a Case 4, assume that the following signal handling specifications are in effect: (1) the POSIX signal action for SIGFPE is to invoke a signal catcher function; and (2) PL/I considers a divide by zero exception to be a signal.

For Case 4, the POSIX semantics specified in steps 1016, 1018, and 1020 do not apply because the signal action for the SIGFPE signal is not "IGNORE", "STOP", "CONTINUE", or "TERMINATE" (with the signal being of such a priority that it cannot be caught or ignored). The signal 1106 is enabled in step 1024 since PL/I considers a divide by zero exception to be a signal. The signal 1106 is not processed in step 1030 since there are no user specified signal handlers associated with Program B 1104 or Program A 1102. The signal 1106 is not processed in step 1034 since PL/I does not define any semantics to process the signal 1106. The signal 1106 is processed in step 1050. Specifically, the signal catcher is invoked to process the signal 1106.

According to an alternate embodiment of the present invention, the present invention represents a computer program product that includes a computer readable medium having computer program logic recorded thereon. The computer program logic enables a computer system to process a first type of interprocess signals (such as POSIX signals) and a second type of interprocess signals (such as non-POSIX signals) according to the procedure discussed above.

While the invention has been particularly shown and described with reference to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A method of processing a first type of interprocess signals and a second type of interprocess signals in a computer system, said first type of interprocess signals conforming to a first signal handling standard and said second type of interprocess signals conforming to a second signal handling standard, wherein said first signal handling standard and said second signal handling standard are of a computer programming language standard and an operating system standard respectively, the method comprising the steps of:

(1) determining whether an interprocess signal is a synchronous signal or an asynchronous signal, wherein said interprocess signal originates from a first processing entity and is received by a second processing entity, said second processing entity and said first processing entity executing concurrently when said interprocess signal originates from said first processing entity;

(2) processing said interprocess signal using signal handling semantics defined by said first signal handling standard if said interprocess signal is an asynchronous signal; and (3) processing said interprocess signal using signal handling semantics defined by said first and second signal handling standards if said interprocess signal is a synchronous signal.

2. The method of claim 1 in which said first processing entity originated said interprocess signal at an origination point in execution and said second processing entity received said interprocess signal at an interrupt point in execution, wherein step (1) comprises the steps of:

determining whether said first processing entity is the same as said second processing entity;

determining whether said origination point in execution is the same as said interrupt point in execution; and concluding that said interprocess signal is a synchronous signal if said first processing entity is the same as said second processing entity, and said origination point in execution is the same as said interrupt point in execution.

3. The method of claim 2, wherein step (1) further comprises the steps of:

concluding that said interprocess signal is an asynchronous signal if said first processing entity and said second processing entity are different; and concluding that said interprocess signal is an asynchronous signal if said origination point in execution and said interrupt point in execution are different.

4. The method of claim 1, wherein step (3) comprises the steps of:

(a) determining whether said interprocess signal is defined by said first signal handling standard; and (b) attempting to process said interprocess signal using predetermined signal handling semantics of said first signal handling standard if said interprocess signal is defined by said first signal handling standard.

5. The method of claim 4 in which a signal action is associated with said interprocess signal, wherein step (b) comprises the steps of:

causing said second processing entity to ignore said interprocess signal if said signal action corresponds to an "IGNORE" value;

causing said second processing entity to stop its execution if said signal action corresponds to a "STOP" value;

causing said second processing entity to continue its execution if said signal action corresponds to a "CONTINUE" value; and causing said second processing entity to terminate its execution if said signal action corresponds to a "TERMINATE" default value, and said interprocess signal is of such a priority that it cannot be ignored or processed using a user supplied signal handling routine.

6. The method of claim 4 in which said first and second processing entities are invocations from a computer program written using a computer programming language, wherein step (3) further comprises the following steps which are performed if said interprocess signal was not processed in step (b) using said predetermined signal handling semantics of the first signal handling standard:

(c) applying predetermined rules of said computer programming language to determine whether said interprocess signal is enabled; and (d) processing said interprocess signal using a predetermined combination of signal handling semantics defined by said first and second signal handling standards if said interprocess signal is enabled.

7. The method of claim 6 in which said first and second processing entities are associated with an invocation stack comprising a plurality of stack frames, wherein step (d) comprises the steps of:

determining whether a user specified signal handler for processing said interprocess signal is registered with any of said stack frames of the invocation stack; and processing said interprocess signal using said user specified signal handler if said user specified signal handler is so registered.

8. The method of claim 7 in which one or more computer programming languages are scoped to said stack frames, wherein step (d) further comprises the steps of:

determining whether any of said computer programming languages scoped to said stack frames defines a language specific signal handling semantic for processing said interprocess signal; and processing said interprocess signal using said language specific signal handling semantic if said language specific signal handling semantic is so defined.

9. The method of claim 8, wherein step (d) further comprises the step of:

processing said interprocess signal using second predetermined signal handling semantics of said first signal handling standard if said interprocess signal is defined by said first signal handling standard.

10. The method of claim 9, wherein step (d) further comprises the step of:

processing said interprocess signal using default semantics defined by said computer programming languages scoped to said stack frames of the invocation stack.

11. A system of processing a first type of interprocess signals and a second type of interprocess signals in a computer system, said first type of signals conforming to a first signal handling standard and said second type of signals conforming to a second signal handling standard, wherein said first signal handling standard and said second signal handling standard are of a computer programming language standard and an operating system standard respectively, the system comprising:

signal determining means for determining whether an interprocess signal is a synchronous signal or an asynchronous signal, wherein said interprocess signal originates from a first processing entity and is received by a second processing entity, said second processing entity and said first processing entity executing concurrently when said interprocess signal originates from said first processing entity;

first signal processing means for processing said interprocess signal using signal handling semantics defined by said first signal handling standard if said interprocess signal is an asynchronous signal; and second signal processing means for processing said interprocess signal using signal handling semantics defined by said first and second signal handling standards if said interprocess signal is a synchronous signal.

12. The system of claim 11, further comprising:

means for specifying in the second processing entity a signal action associated with each interprocess signal received by the second processing entity;

means for receiving in the second processing entity the interprocess signal from the first processing entity at an interrupt point in the second processing entity, wherein the interrupt point depends on a time that the interprocess signal is received;

means for associating a signal action with the received interprocess signal; and means for executing in the second processing entity the associated signal action immediately upon receipt of the interprocess signal.

13. The system of claim 12 in which said first processing entity originated said interprocess signal at an origination point in execution and said second processing entity received said interprocess signal at an interrupt point in execution, wherein said signal determining means comprises:

means for determining whether said first processing entity is the same as said second processing entity;

means for determining whether said origination point in execution is the same as said interrupt point in execution; and means for concluding that said interprocess signal is a synchronous signal if said first processing entity is the same as said second processing entity, and said origination point in execution is the same as said interrupt point in execution.

14. The system of claim 13, wherein said signal determining means further comprises:

means for concluding that said interprocess signal is an asynchronous signal if said first processing entity and said second processing entity are different; and means for concluding that said interprocess signal is an asynchronous signal if said origination point in execution and said interrupt point in execution are different.

15. The system of claim 12, wherein said second signal processing means comprises:

means for determining whether said interprocess signal is defined by said first signal handling standard; and third signal processing means for attempting to process said interprocess signal using predetermined signal handling semantics of said first signal handling standard if said interprocess signal is defined by said first signal handling standard.

16. The system of claim 15, wherein said third signal processing means comprises:

means for causing said second processing entity to ignore said interprocess signal if said signal action corresponds to an "IGNORE" value;

means for causing said second processing entity to stop its execution if said signal action corresponds to a "STOP" value;

means for causing said second processing entity to continue its execution if said signal action corresponds to a "CONTINUE" value; and means for causing said second processing entity to terminate its execution if said signal action corresponds to a "TERMINATE" default value, and said interprocess signal is of such a priority that it cannot be ignored or processed using a user supplied signal handling routine.

17. The system of claim 15 in which said first and second processing entities are invocations from a computer program written using a computer programming language, wherein said second signal processing means further comprises:

means for applying predetermined rules of said computer programming language to determine whether said interprocess signal is enabled; and fourth signal processing means for processing said interprocess signal using a predetermined combination of signal handling semantics defined by said first and second signal handling standards if said interprocess signal is enabled.

18. The system of claim 17 in which said first and second processing entities are associated with an invocation stack comprising a plurality of stack frames, wherein said fourth signal processing means comprises:

means for determining whether a user specified signal handler for processing said interprocess signal is registered with any of said stack frames of the invocation stack; and means for processing said interprocess signal using said user specified signal handler if said user specified signal handler is so registered.

19. The system of claim 18 in which one or more computer programming languages are scoped to said stack frames, wherein said fourth signal processing means further comprises:

means for determining whether any of said computer programming languages scoped to said stack frames defines a language specific signal handling semantic for processing said interprocess signal; and means for processing said interprocess signal using said language specific signal handling semantic if said language specific signal handling semantic is so defined.

20. The system of claim 19, wherein said fourth signal processing means further comprises:

means for processing said interprocess signal using second predetermined signal handling semantics of said first signal handling standard if said interprocess signal is defined by said first signal handling standard.

21. The system of claim 20, wherein said fourth signal processing means further comprises:

means for processing said interprocess signal using default semantics defined by said computer programming languages scoped to said stack frames of the invocation stack.

22. The method of claim 1, further comprising the steps of:

specifying in the second processing entity a signal action associated with each interprocess signal received by the second processing entity;

receiving in the second processing entity the interprocess signal from the first processing entity at an interrupt point in the second processing entity, wherein the interrupt point depends on a time that the interprocess signal is received;

associating in the second processing entity a signal action with the received interprocess signal; and executing the associated signal action immediately upon receipt of the interprocess signal.

23. A system for processing a first type of interprocess signals and a second type of interprocess signals in a computer system, said first type of signals conforming to a first signal handling standard and said second type of signals conforming to a second signal handling standard, wherein said first signal handling standard and said second signal handling standard are of a computer programming language standard and an operating system standard respectively, the system comprising:

means for executing a first processing entity;

means for executing a second processing entity concurrently with said first processing entity;

means for originating an interprocess signal from said first processing entity when said second processing entity is executing concurrently with said first processing entity;

means, in the second processing entity, for receiving the interprocess signal;

signal determining means for determining whether said interprocess signal is a synchronous signal or an asynchronous signal;

first signal processing means for processing said interprocess signal in the second processing entity using signal handling semantics defined by said first signal handling standard if said interprocess signal is an asynchronous signal; and second signal processing means for processing said interprocess signal in the second processing entity using signal handling semantics defined by said first signal handling standard and said second signal handling standard if said interprocess signal is a synchronous signal.

24. The system of claim 23 in which said first processing entity originates said interprocess signal at an origination point and said second processing entity receives said interprocess signal at an interrupt point, wherein said signal determining means comprises:

means for determining whether said first processing entity is the same as said second processing entity;

means for determining whether said origination point is the same as said interrupt point; and means for concluding that said interprocess signal is a synchronous signal if said first processing entity is the same as said second processing entity, and said origination point is the same as said interrupt point.

25. The system of claim 23, further comprising:

means for associating in the second processing entity a signal action with each received interprocess signal;

means for receiving the interprocess signal from the first processing entity at an interrupt point in the second processing entity, wherein the interrupt point depends on a time that the interprocess signal is received;

means for associating a signal action with the received interprocess signal; and means for executing the associated signal action immediately upon the receipt of the interprocess signal.

* * * * *